E. ANDERSON.
COMBINED HARROW AND CULTIVATOR.
APPLICATION FILED JUNE 5, 1914.

1,155,192.

Patented Sept. 28, 1915.
2 SHEETS—SHEET 1.

Witnesses
Hugh Hott
V. B. Hillyard.

Inventor
Erik Anderson
By Victor J. Evans
Attorney

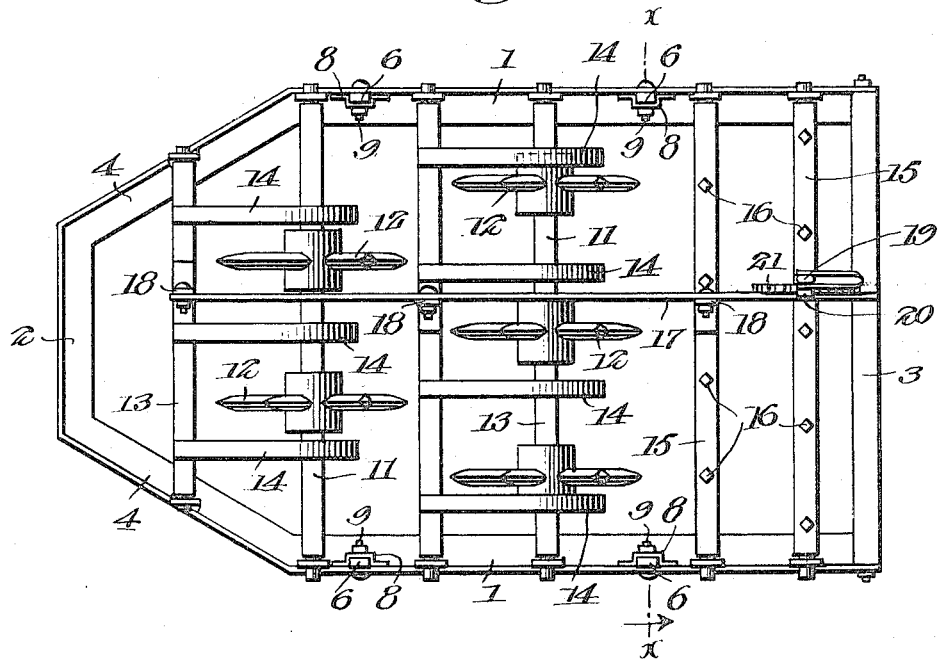
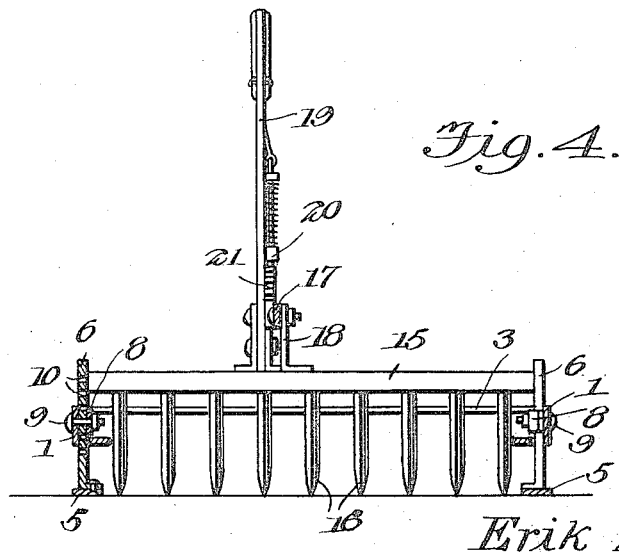

UNITED STATES PATENT OFFICE.

ERIK ANDERSON, OF SAN FRANCISCO, CALIFORNIA.

COMBINED HARROW AND CULTIVATOR.

1,155,192.  Specification of Letters Patent.  Patented Sept. 28, 1915.

Application filed June 5, 1914. Serial No. 843,256.

*To all whom it may concern:*

Be it known that I, ERIK ANDERSON, a citizen of Finland, residing at San Francisco, in the county of San Francisco and State of California, have invented new and useful Improvements in Combined Harrows and Cultivators, of which the following is a specification.

The invention relates generally to agricultural implements and particularly to the type intended chiefly for tilling the soil.

The invention consists of an implement comprising a frame provided with means for tilling the soil and vertically adjustable supports for regulating the depth of action of the earth treating devices mounted upon the frame.

The invention also consists of an implement embodying harrow teeth, spring cultivator teeth and rotary cutters, the harrow teeth and cultivator teeth being adjustable independently of the vertical adjustment of the frame to regulate the pitch of the teeth according to the nature of the soil to be tilled.

The invention consists of the novel features, details of construction and combination of parts, which hereinafter will be more particularly set forth, illustrated and claimed.

Figure 1:
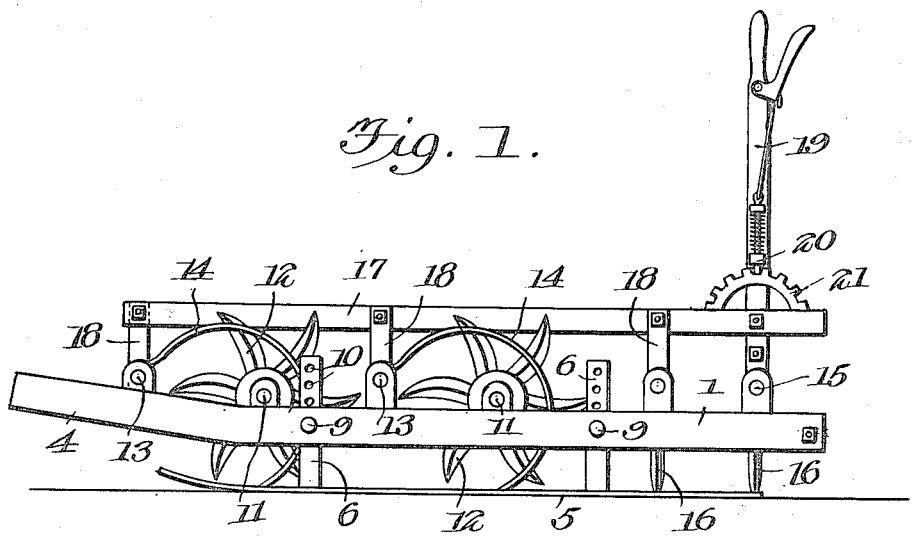
Figure 2:
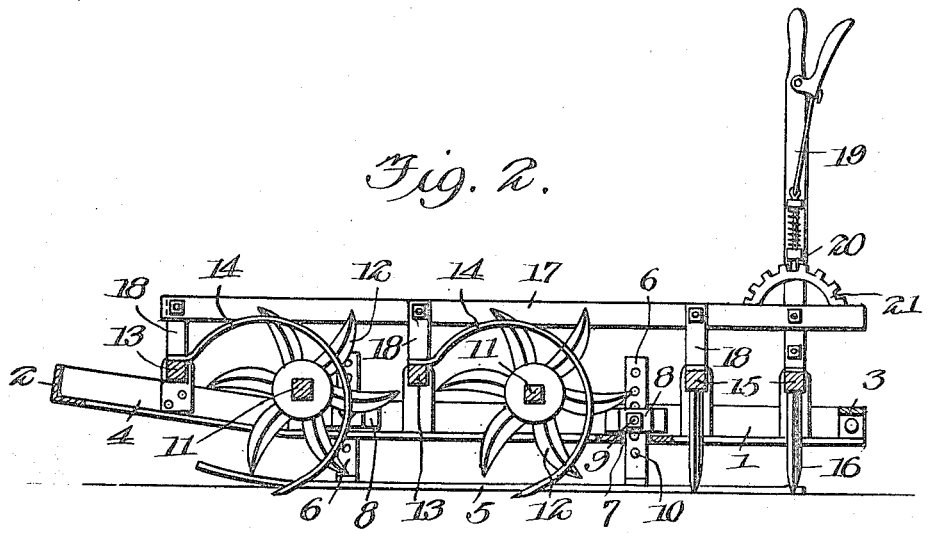

In the drawings, hereto attached:—Figure 1 is a side view of a combined cultivator and harrow embodying the invention. Fig. 2 is a vertical central longitudinal section, the full and dotted lines indicating different adjustments of the cultivator and harrow teeth. Fig. 3 is a top plan view. Fig. 4 is a transverse section on the line *x—x* of Fig. 3.

Corresponding and like parts are referred to in the following description, and indicated in all the views of the drawings, by the same reference characters.

The main frame of the implement comprises longitudinal bars 1, a front cross bar 2 and a rear cross bar 3. The bars 1 and 2 preferably constitute parts of a single bar which is bent into the shape substantially shown in plan view. The front portion of the bars 1 are bent inwardly as shown at 4 whereby the front portion of the frame is made tapering. The rear cross bar 3 preferably consists of a flat bar the ends of which are bent and bolted or otherwise secured to the rear ends of the bars 1. The members 1 and 2 in the preferred construction are formed of an angle bar which is arranged with one flange in vertical position and the other flange in horizontal position and facing inward. The frame is mounted upon supports 5 which consist of runners arranged to have a vertical adjustment whereby the main frame may be raised or lowered to regulate the depth of action of the earth treating devices. Standards 6 project vertically from the runners 5 and pass through openings 7 formed in the horizontal flanges of the bars 1 and through keepers 8 secured to the inner sides of the vertical flanges of the bars 1. Bolts or pins 9 pass through registering openings formed in the keepers 8 and vertical flanges of the bars 1 and through one of a plurality of openings 10 formed in the standard 6 thereby serving as fastening means for securing the runners in the required adjusted position.

Bars 11 are mounted at their ends in bearings provided upon the longitudinal bars 1 and receive rotary cutters 12 which are mounted upon such bars 11, each of the rotary cutters 12 consists of a hub and curved blade, the latter having the curved edges sharpened so as to cut through turf, weeds and the like. The cutters 12 upon one of the bars 11 are arranged opposite the spaces formed between the cutters mounted upon the other one of such bars, whereby such cutters have a staggered arrangement so as to operate more effectively in the tilling of the soil.

Bars 13, similar to the bars 11 are mounted in a like manner upon the bars 1 and are provided in their length with spring teeth 14 which serve to cultivate the soil. Other bars 15 are mounted upon the bars 1 in a manner similar to the bars 11 and 13 and are provided with harrow teeth 16. It is noted that the cultivator teeth, as well as the harrow teeth have a staggered arrangement. The relative inclination or pitch of the cultivator and harrow teeth is adapted to be regulated by turning the bars 13 and 15 about their journals and this result is effected by means of a connecting bar 17 which is pivoted to standards 18 projecting upwardly from the bars 13 and 15. An operating lever 19 is pivoted near its lower end to the connecting bar 17 and is secured to the standard of one of the toothed bars 13 and 15 and such operating lever is provided with a hand latch 20 which is adapted to coöperate with a toothed segment 21 attached to the connecting bar 17 to hold the toothed bar in the required adjusted position.

It will be understood from the foregoing taken in connection with the accompanying drawings that the invention provides an implement which may be used both as a cultivator and harrow and which is adjustable to regulate the depth of the teeth, cutters or like earth treating devices or a pitch or inclination of the teeth at any vertical adjustment of the main frame. It is further noted that the several operations may be performed at one time without requiring the employment of different implements to be drawn over the field at different times.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the invention as claimed.

Having thus described the invention, what is claimed as new is:—

In a device of the class described, a main frame, spaced transverse bars having their ends mounted in bearings at the sides of the main frame, connections between said bars to cause them to turn simultaneously, means to turn said bars, axle shafts arranged alternately with respect to said bars, mounted in bearings and having rotary cutters, and substantially reversely C-shaped spring harrow teeth, each extending over and to the rear of one of the axle shafts and having a forwardly extending arm attached to one of the transverse bars, each of said harrow teeth being arranged near one side of one of the cutters, the said cutters being arranged in staggered relation.

In testimony whereof I affix my signature in presence of two witnesses.

ERIK ANDERSON.

Witnesses:
  HENRY O. CARLSON,
  JOHN E. SMITH.